US012712130B2

(12) United States Patent
Wu et al.

(10) Patent No.: US 12,712,130 B2
(45) Date of Patent: Aug. 18, 2026

(54) MULTI-LAYER CERAMIC CAPACITOR

(71) Applicant: YAGEO CORPORATION, Kaohsiung City (TW)

(72) Inventors: Ming-Chun Wu, Kaohsiung City (TW); Hsin-Yen Liu, Kaohsiung City (TW); Fen-Sheng Hsu, Kaohsiung City (TW); Ing-Ping Lee, Kaohsiung City (TW)

(73) Assignee: YAGEO CORPORATION, Kaohsiung City (TW)

( * ) Notice: Subject to any disclaimer, the term of this patent is extended or adjusted under 35 U.S.C. 154(b) by 143 days.

(21) Appl. No.: 18/761,339

(22) Filed: Jul. 2, 2024

(65) Prior Publication Data

US 2025/0266211 A1 Aug. 21, 2025

(30) Foreign Application Priority Data

Feb. 19, 2024 (TW) ................................ 113105743

(51) Int. Cl.
*H01G 4/232* (2006.01)
*H01G 4/005* (2006.01)
*H01G 4/30* (2006.01)

(52) U.S. Cl.
CPC ........... *H01G 4/2325* (2013.01); *H01G 4/005* (2013.01); *H01G 4/30* (2013.01)

(58) Field of Classification Search
CPC ......... H01G 4/2325; H01G 4/005; H01G 4/30
See application file for complete search history.

(56) References Cited

U.S. PATENT DOCUMENTS 10,062,506 B2 8/2018 Choi et al.
10,074,481 B2 9/2018 Park et al.
10,187,994 B2 1/2019 You et al.
10,468,193 B2 11/2019 Park et al.
10,537,025 B2 1/2020 You et al.
2014/0138136 A1* 5/2014 Ahn .................... H05K 3/3442 361/301.4

(Continued)

FOREIGN PATENT DOCUMENTS

CN 104979096 A 10/2015
CN 115910602 A 4/2023

(Continued)

*Primary Examiner* — Michael P Mcfadden
(74) *Attorney, Agent, or Firm* — CKC & Partners Co., LLC

(57) ABSTRACT

A multi-layer ceramic capacitor includes a multi-layer brick and first and second terminal electrodes. The multi-layer brick includes a ceramic body and plural first and second internal electrodes. The ceramic body has first and second surfaces opposite to each other, and first and second end surfaces opposite to each other. The first and second internal electrodes are alternately embedded in the ceramic body. The first and second internal electrodes respectively extend from the first and second end surfaces. The first terminal electrode extends through the first end surface to a first portion of the second surface, and includes a first stress buffer layer located inside the first terminal electrode under the first portion. The second terminal electrode extends through the second end surface to a second portion of the second surface, and includes a second stress buffer layer located inside the second terminal electrode under the second portion.

16 Claims, 4 Drawing Sheets

(56) References Cited

U.S. PATENT DOCUMENTS

| | | | | |
|---|---|---|---|---|
| 2019/0237259 | A1* | 8/2019 | Onodera | H01G 4/005 |
| 2020/0211774 | A1* | 7/2020 | Onodera | H01G 4/248 |
| 2020/0234887 | A1* | 7/2020 | Muramatsu | H01G 4/1218 |
| 2020/0273621 | A1* | 8/2020 | Yi | H01G 4/248 |
| 2020/0312550 | A1* | 10/2020 | Nagai | H01G 4/33 |
| 2021/0343475 | A1* | 11/2021 | Takeuchi | H01G 4/1209 |
| 2022/0392707 | A1* | 12/2022 | Lee | H01G 4/12 |

FOREIGN PATENT DOCUMENTS

| | | | |
|---|---|---|---|
| TW | 201440098 | A | 10/2014 |
| TW | 201443945 | A | 11/2014 |
| TW | I668719 | B | 8/2019 |
| TW | 202209717 | A | 3/2022 |

* cited by examiner

MULTI-LAYER CERAMIC CAPACITOR

CROSS-REFERENCE TO RELATED APPLICATION

This application claims priority to Taiwan Application Serial Number 113105743, filed Feb. 19, 2024, which is herein incorporated by reference.

BACKGROUND

Field of Invention

The present disclosure relates to a technology for manufacturing a capacitor, and more particularly, to a multi-layer ceramic capacitor (MLCC).

Description of Related Art

Multi-layer ceramic capacitors are a kind of ceramic capacitors, and capacitance of which is mainly proportional to a surface area of the product and a number of stacked ceramic films. The multi-layer ceramic capacitors can be directly mounted by a surface mount technology (SMT), and the multi-layer ceramic capacitors are easy to be formed into chips and have small volumes, such that the multi-layer ceramic capacitors have become a mainstream product in the capacitor industry and are applied in various electronic devices.

The multi-layer ceramic capacitor may include a ceramic body, and internal electrodes of two different polarities embedded alternately in the ceramic body, in which a portion of the ceramic body is sandwiched between adjacent two of the internal electrodes as a dielectric layer. The strong dielectric property of the ceramics causes a piezoelectric effect, such that when a voltage is applied to the multi-layer ceramic capacitor, the ceramic body will expand and contract vertically and horizontally, resulting in deformation and vibrating of a circuit board on which the multi-layer ceramic capacitor is located. When the vibration frequency of the circuit board falls within the hearing range of the human, the sound generated due to the vibration will become noise, which is so-called acoustic noise.

Such noise easily makes users uncomfortable, and a howling phenomenon will affect reliability of electronic devices, such that there is a need for a technology for manufacturing a capacitor to solve a howling problem of a multi-layer ceramic capacitor.

SUMMARY

Therefore, one objective of the present disclosure is to provide a multi-layer ceramic capacitor, which can effectively solve a howling problem of the multi-layer ceramic capacitor.

According to the aforementioned objectives, the present disclosure provides a multi-layer ceramic capacitor. The multi-layer ceramic capacitor includes a multi-layer brick, a first terminal electrode, and a second terminal electrode. The multi-layer brick includes a ceramic body, plural first internal electrodes, and plural second internal electrodes. The ceramic body has a first surface and a second surface that are opposite to each other, and a first end surface and a second end surface that are opposite to each other. The first end surface and the second end surface are connected between the first surface and the second surface. The first internal electrodes and the second internal electrodes are alternately embedded in the ceramic body in sequence and physically separated from each other. The first internal electrodes extend from the first end surface toward the second end surface and are spaced apart from the second end surface. The second internal electrodes extend from the second end surface toward the first end surface and are spaced apart from the first end surface. The first terminal electrode extends from a first portion of the first surface through the first end surface to a first portion of the second surface. The first terminal electrode includes a first stress buffer layer located in an inner of the first terminal electrode under the first portion of the second surface. The second terminal electrode extends from a second portion of the first surface through the second end surface to a second portion of the second surface. The first terminal electrode and the second terminal electrode are physically separated from each other. The second terminal electrode includes a second stress buffer layer located in an inner of the second terminal electrode under the second portion of the second surface.

According to one embodiment of the present disclosure, the first internal electrodes and the second internal electrodes are perpendicular to the first surface and the second surface.

According to one embodiment of the present disclosure, the first terminal electrode includes a first terminal electrode inner layer and a first terminal electrode outer layer. The first terminal electrode inner layer covers the first portion of the first surface, the first end surface, and the first portion of the second surface. The first stress buffer layer is located under the first terminal electrode inner layer. The first terminal electrode outer layer covers the first terminal electrode inner layer and the first stress buffer layer. The second terminal electrode includes a second terminal electrode inner layer and a second terminal electrode outer layer. The second terminal electrode inner layer covers the second portion of the first surface, the second end surface, and the second portion of the second surface. The second stress buffer layer is located under the second terminal electrode inner layer. The second terminal electrode outer layer covers the second terminal electrode inner layer and the second stress buffer layer.

According to one embodiment of the present disclosure, a thickness of the first stress buffer layer and a thickness of the second stress buffer layer are both equal to or greater than 100 μm.

According to one embodiment of the present disclosure, the first internal electrodes and the second internal electrodes are separated from the first surface by a first distance, the first internal electrodes and the second internal electrodes are separated from the second surface by a second distance, the first distance is equal to the second distance, and the first distance and the second distance are equal to or greater than 25 μm.

According to one embodiment of the present disclosure, the first internal electrodes and the second internal electrodes are separated from the first surface by a first distance, the first internal electrodes and the second internal electrodes are separated from the second surface by a second distance, and the second distance is greater than the first distance. The first distance is equal to or greater than 25 μm, and the second distance is equal to or greater than 100 μm.

According to one embodiment of the present disclosure, materials of the first stress buffer layer and the second stress buffer layer are silver paste or copper paste.

According to one embodiment of the present disclosure, the first terminal electrode outer layer includes a first conductive layer and a second conductive layer. The first conductive layer covers the first terminal electrode inner layer and the first stress buffer layer. The second conductive layer covers the first conductive layer. The second terminal electrode outer layer includes a third conductive layer and a fourth conductive layer. The third conductive layer covers the second terminal electrode inner layer and the second stress buffer layer. The fourth conductive layer covers the third conductive layer.

According to one embodiment of the present disclosure, materials of the first terminal electrode inner layer and the second terminal electrode inner layer are copper, silver, or silver-palladium alloy, materials of the first conductive layer and the third conductive layer are nickel, and materials of the second conductive layer and the fourth conductive layer are tin.

According to one embodiment of the present disclosure, the first stress buffer layer and the second stress buffer layer respectively contact with the first portion and the second portion of the second surface. The first terminal electrode includes a first terminal electrode inner layer and a first terminal electrode outer layer. The first terminal electrode inner layer covers the first portion of the first surface, the first end surface, and the first stress buffer layer. The first terminal electrode outer layer covers the first terminal electrode inner layer and the first stress buffer layer. The second terminal electrode includes a second terminal electrode inner layer and a second terminal electrode outer layer. The second terminal electrode inner layer covers the second portion of the first surface, the second end surface, and the second stress buffer layer. The second terminal electrode outer layer covers the second terminal electrode inner layer and the second stress buffer layer.

According to one embodiment of the present disclosure, a thickness of the first stress buffer layer and a thickness of the second stress buffer layer are both equal to or greater than 100 μm.

According to one embodiment of the present disclosure, the first internal electrodes and the second internal electrodes are separated from the first surface by a first distance, and the first internal electrodes and the second internal electrodes are separated from the second surface by a second distance. The first distance is equal to the second distance. The first distance and the second distance are equal to or greater than 25 μm.

According to one embodiment of the present disclosure, the first internal electrodes and the second internal electrodes are separated from the first surface by a first distance, and the first internal electrodes and the second internal electrodes are separated from the second surface by a second distance. The second distance is greater than the first distance. The first distance is equal to or greater than 25 μm, and the second distance is equal to or greater than 100 μm.

According to one embodiment of the present disclosure, materials of the first stress buffer layer and the second stress buffer layer are silver paste or copper paste.

According to one embodiment of the present disclosure, materials of the first stress buffer layer and the second stress buffer layer are non-conductive materials.

According to one embodiment of the present disclosure, the first terminal electrode outer layer includes a first conductive layer and a second conductive layer. The first conductive layer covers the first terminal electrode inner layer and the first stress buffer layer. The second conductive layer covers the first conductive layer. The second terminal electrode outer layer includes a third conductive layer and a fourth conductive layer. The third conductive layer covers the second terminal electrode inner layer and the second stress buffer layer. The fourth conductive layer covering the third conductive layer.

According to the aforementioned embodiments, it is known that an impact of expansion and contraction of the ceramic body on a circuit board due to a piezoelectric effect can be decreased, and a distance between the ceramic body and the circuit board can be increased by arranging the stress buffer layers within the terminal electrodes. Therefore, a vibration amplitude of the circuit board can be greatly reduced, and the resonance of the air between the ceramic body and the circuit board can be prevented, such that a howling problem of the multi-layer ceramic capacitor is effectively solved. In addition, the internal electrodes may be arranged to be perpendicular to the upper surface and the lower surface of the ceramic body, such that an acoustic noise value of the multi-layer ceramic capacitor is not affected by an amount of a solder paste used for external bonding. Furthermore, the internal electrodes may be disposed further away from the lower surface of the ceramic body and closer to the upper surface of the ceramic body to increase the distance between the internal electrodes and the underlying circuit board, such that the vibration of the circuit board is further reduced.

BRIEF DESCRIPTION OF THE DRAWINGS

Aspects of the present disclosure are best understood from the following detailed description in conjunction with the accompanying figures. It is noted that in accordance with the standard practice in the industry, various features are not drawn to scale. In fact, dimensions of the various features can be arbitrarily increased or reduced for clarity of discussion.

DETAILED DESCRIPTION

Figure 1:
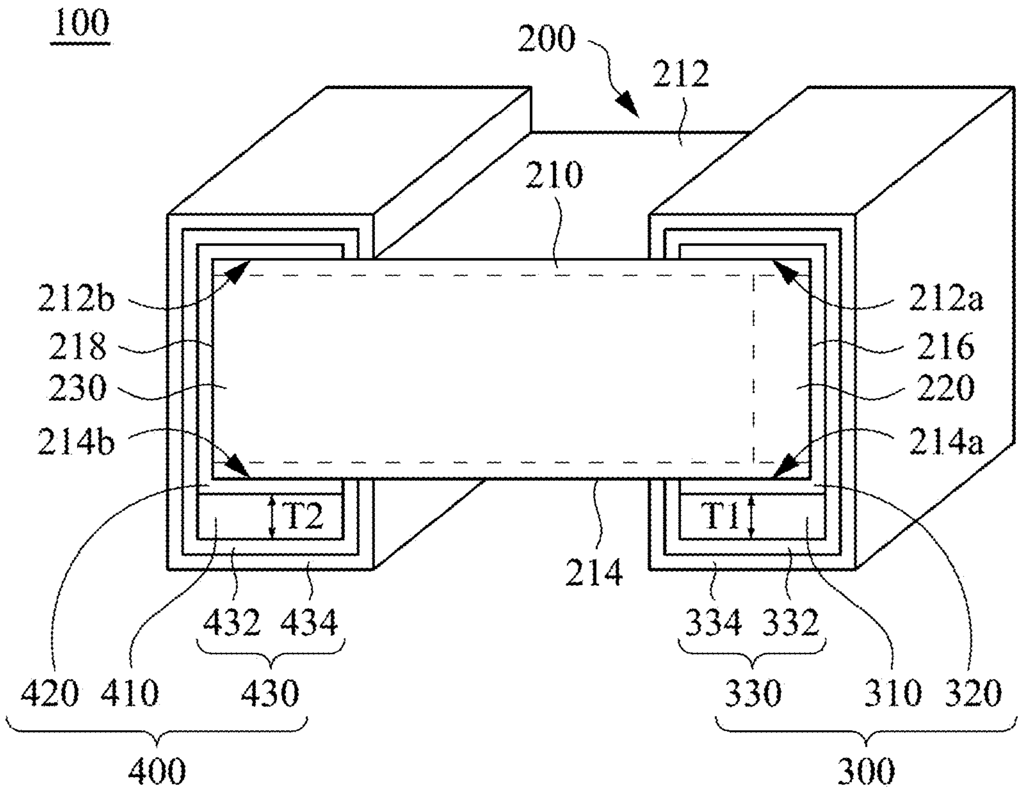
FIG. 1 is a schematic three-dimensional view of a multi-layer ceramic capacitor in accordance with a first embodiment of the present disclosure.
Figure 2:
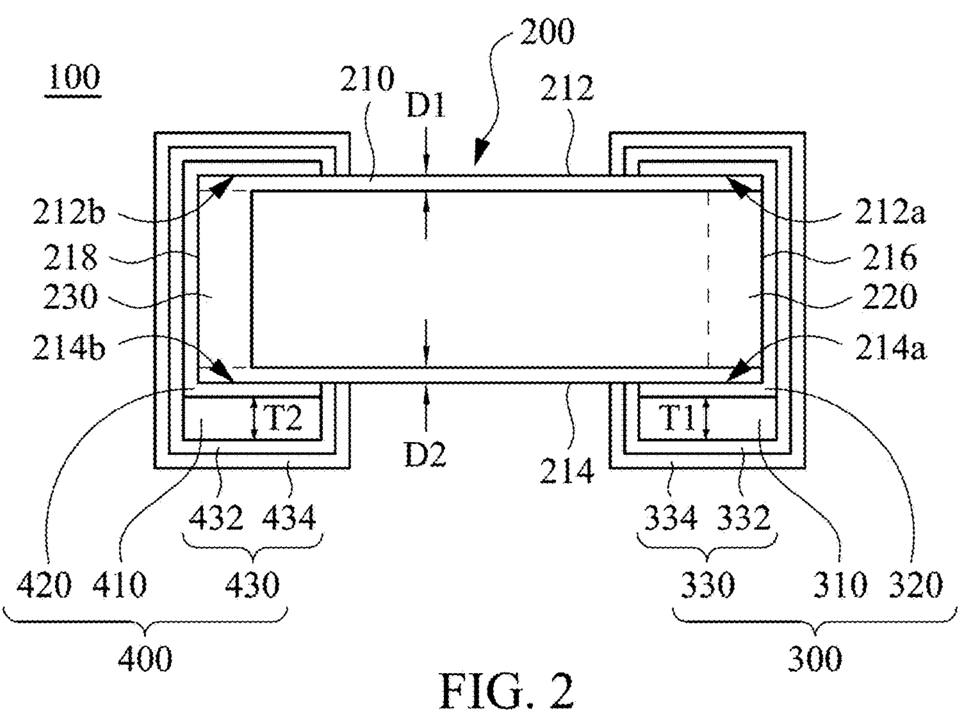
FIG. 2 is a schematic cross-sectional view of the multi-layer ceramic capacitor in accordance with the first embodiment of the present disclosure.

Referring to FIG. 1 and FIG. 2, FIG. 1 and FIG. 2 respectively illustrate a schematic three-dimensional view and a schematic cross-sectional view of a multi-layer ceramic capacitor 100 in accordance with a first embodiment of the present disclosure. The multi-layer ceramic capacitor 100 may mainly include a multi-layer brick 200, a first terminal electrode 300, and a second terminal electrode 400. For example, the multi-layer brick 200 may be a cuboid or a cube. However, the shape of the multi-layer brick 200 may be designed according to product requirements, and the present disclosure is not limited thereto. The multi-layer brick 200 may mainly include a ceramic body 210, plural first internal electrodes 220, and plural second internal electrodes 230.

The ceramic body 210 constitutes the main body of the multi-layer brick 200. The ceramic body 210 may be, for example, a cuboid or a cube. The ceramic body 210 may be formed by stacking several ceramic green sheets and sintering the stacked ceramic green sheets. The ceramic body 210 has a first surface 212 and a second surface 214 that are opposite to each other, and a first end surface 216 and a second end surface 218 that are opposite to each other. For example, the first surface 212 and the second surface 214 may be respectively an upper surface and a lower surface of the ceramic body 210, and the first end surface 216 and the second end surface 218 may be two opposite side surfaces of the ceramic body 210 respectively. The first end surface 216 and the second end surface 218 are connected between the first surface 212 and the second surface 214.

The first internal electrodes 220 and the second internal electrodes 230 are embedded in the ceramic body 210 and are physically separated from each other. Each of the first internal electrodes 220 and the second internal electrodes 230 is a sheet structure. The first internal electrodes 220 and the second internal electrodes 230 are alternately arranged in sequence. Each of the first internal electrodes 220 extends from the first end surface 216 of the ceramic body 210 toward the second end surface 218 and is spaced apart from the second end surface 218. Each of the second internal electrodes 230 extends from the second end surface 218 of the ceramic body 210 toward the first end surface 216 and is spaced apart from the first end surface 216. For example, materials of the first internal electrodes 220 and the second internal electrodes 230 may be copper, silver, or nickel.

In some examples, the first surface 212 and the second surface 214 are parallel to each other, and the first internal electrodes 220 and the second internal electrodes 230 are parallel to the first surface 212 and the second surface 214. As shown in FIG. 2, in some exemplary examples, the first surface 212 and the second surface 214 are parallel to each other, and the first internal electrodes 220 and the second internal electrodes 230 are perpendicular to the first surface 212 and the second surface 214. In such examples, an acoustic noise value of the multi-layer ceramic capacitor 100 is not affected by an amount of a solder paste used for external bonding. In addition, the first internal electrodes 220 and the second internal electrodes 230 are at the same height. The first internal electrodes 220 and the second internal electrodes 230 are separated from the first surface 212 by a first distance D1, and the first internal electrodes 220 and the second internal electrodes 230 are separated from the second surface 214 by a second distance D2. The first distance D1 is equal to the second distance D2. In some examples, the first distance D1 and the second distance D2 are equal to or greater than 25 μm.

The first terminal electrode 300 extends from a first portion 212*a* of the first surface 212 of the ceramic body 210, which is adjacent to the first end surface 216, through the first end surface 216 to a first portion 214*a* of the second surface 214, which is adjacent to the first end surface 216. The first terminal electrode 300 may be generally in an inverted C shape. The first terminal electrode 300 is a multi-layer structure. The first terminal electrode 300 includes a first stress buffer layer 310. The first stress buffer layer 310 is located in an inner of the first terminal electrode 300 and under the first portion 214*a* of the second surface 214. Specifically, the first stress buffer layer 310 is only disposed on the first portion 214*a* of the second surface 214 and does not extend on the first end surface 216. In the present embodiment, the first stress buffer layer 310 is formed of a soft conductive material. For example, a material of the first stress buffer layer 310 may be silver paste or copper paste. The first stress buffer layer 310 has a thickness T1. In some examples, the thickness T1 is equal to or greater than 100 μm.

In some examples, the first terminal electrode 300 further includes a first terminal electrode inner layer 320 and a first terminal electrode outer layer 330. The first terminal electrode inner layer 320 covers the first portion 212*a* of the first surface 212, the first end surface 216, and the first portion 214*a* of the second surface 214 of the ceramic body 210, and is generally in an inverted C shape. The first stress buffer layer 310 is located below the first terminal electrode inner layer 320. The first terminal electrode inner layer 320 may be a single-layer structure. For example, a material of the first terminal electrode inner layer 320 may be copper, silver, or silver-palladium alloy. The first terminal electrode outer layer 330 covers the first terminal electrode inner layer 320 and the first stress buffer layer 310, such that the first stress buffer layer 310 is located in the inner of the first terminal electrode 300. The first terminal electrode outer layer 330 may be a single-layer structure or a multi-layer structure. In some examples, the first terminal electrode outer layer 330 includes a first conductive layer 332 and a second conductive layer 334 stacked on each other. The first conductive layer 332 covers the first terminal electrode inner layer 320 and the first stress buffer layer 310. The second conductive layer 334 covers the first conductive layer 332. For example, a material of the first conductive layer 332 may be nickel, and a material of the second conductive layer 334 may be tin.

The second terminal electrode 400 extends from a second portion 212*b* of the first surface 212 of the ceramic body 210, which is adjacent to the second end surface 218, through the second end surface 218 to a second portion 214*b* of the second surface 214, which is adjacent to the second end surface 218. The second terminal electrode 400 may be generally in a C shape. The second terminal electrode 400 and the first terminal electrode 300 are physically separated from each other. The second terminal electrode 400 is a multi-layer structure. The second terminal electrode 400 includes a second stress buffer layer 410. The second stress buffer layer 410 is located in an inner of the second terminal electrode 400 and under the second portion 214*b* of the second surface 214. The second stress buffer layer 410 is only disposed under the second portion 214*b* of the second surface 214 and does not extend on the second end surface 218. Similarly, the second stress buffer layer 410 is formed of a soft conductive material. A material of the second stress buffer layer 410 may be, for example, silver paste or copper paste. The second stress buffer layer 410 has a thickness T2, in which the thickness T2 is substantially equal to the thickness T1. In some examples, the thickness T2 is equal to or greater than 100 μm.

In some examples, the second terminal electrode 400 further includes a second terminal electrode inner layer 420 and a second terminal electrode outer layer 430. The second terminal electrode inner layer 420 covers the second portion 212*b* of the first surface 212, the second end surface 218, and the second portion 214*b* of the second surface 214 of the ceramic body 210, and is generally in a C shape. The second stress buffer layer 410 is located below the second terminal electrode inner layer 420. The second terminal electrode inner layer 420 may be a single-layer structure. For example, a material of the second terminal electrode inner layer 420 may be copper, silver, or silver-palladium alloy. The second terminal electrode outer layer 430 covers the second terminal electrode inner layer 420 and the second stress buffer layer 410. The second terminal electrode outer layer 430 may be a single-layer structure or a multi-layer structure. In some examples, the second terminal electrode outer layer 430 includes a third conductive layer 432 and a fourth conductive layer 434 stacked on each other. The third conductive layer 432 covers the second terminal electrode inner layer 420 and the second stress buffer layer 410. The fourth conductive layer 434 covers the third conductive layer 432. For example, a material of the third conductive layer 432 may be nickel, and a material of the fourth conductive layer 434 may be tin.

The first stress buffer layer 310 and the second stress buffer layer 410 are formed after the first terminal electrode inner layer 320 and the second terminal electrode inner layer 420, such that the first terminal electrode inner layer 320 and the second terminal electrode inner layer 420 can be formed by attaching a conductive material and thermally curing the conductive material.

An impact of electrostriction of the ceramic body 210 on a circuit board can be decreased, and a distance between the ceramic body 210 and the circuit board can be increased by arranging the first stress buffer layer 310 and the second stress buffer layer 410. Therefore, the vibration amplitude of the circuit board can be greatly reduced, and the resonance of the air between the ceramic body 210 and the circuit board can be prevented, such that a howling problem of the multi-layer ceramic capacitor 100 can be effectively solved. In addition, the first internal electrodes 220 and the second internal electrodes 230 are perpendicular to the first surface 212 and the second surface 214 of the ceramic body 210, such that an acoustic noise value of the multi-layer ceramic capacitor 100 is not affected by an amount of a solder paste used for external bonding.

Figure 3:
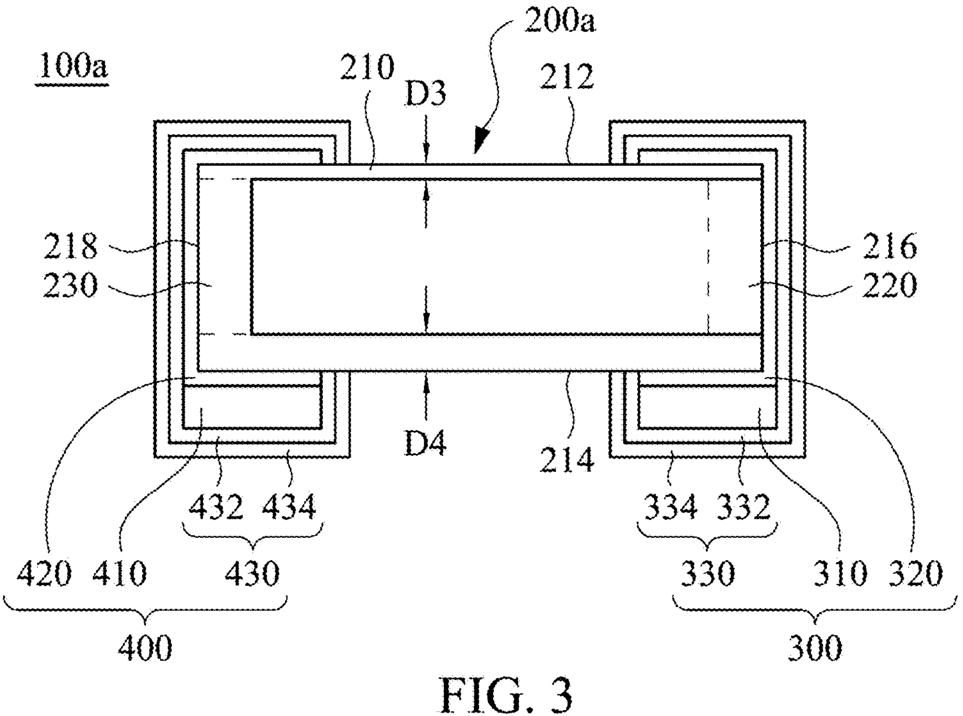
FIG. 3 is a schematic cross-sectional view of a multi-layer ceramic capacitor in accordance with a second embodiment of the present disclosure.

Referring to FIG. 3, FIG. 3 is a schematic cross-sectional view of a multi-layer ceramic capacitor 100*a* in accordance with a second embodiment of the present disclosure. The structure of the multi-layer ceramic capacitor 100*a* is substantially the same as the structure of the aforementioned multi-layer ceramic capacitor 100, and a difference between the multi-layer ceramic capacitors 100*a* and 100 is that first internal electrodes 220 and second internal electrodes 230 of a multi-layer brick 200*a* of the multi-layer ceramic capacitor 100*a* are separated from the first surface 212 and the second surface 214 of the ceramic body 210 by different distances.

Specifically, the first internal electrodes 220 and the second internal electrodes 230 are substantially at the same height, the first internal electrodes 220 and the second internal electrodes 230 are separated from the first surface 212 by a first distance D3, and the first internal electrodes 220 and the second internal electrodes 230 are separated from the second surface 214 by a second distance D4, in which the second distance D4 is greater than the first distance D3. In some examples, the first distance D3 is equal to or greater than 25 μm, and the second distance D4 is equal to or greater than 100 μm.

By arranging the first internal electrodes 220 and the second internal electrodes 230 further away from the second surface 214 of the ceramic body 210 and closer to the first surface 212 of the ceramic body 210, a distance that the first internal electrodes 220 and the second internal electrodes 230 are separated from a mounted surface of an underlying circuit board can be increased. Therefore, the impact of electrostriction of the ceramic multi-layer brick 200*a* on the circuit board can be further decreased, thereby reducing the vibration of the circuit board.

Figure 4:
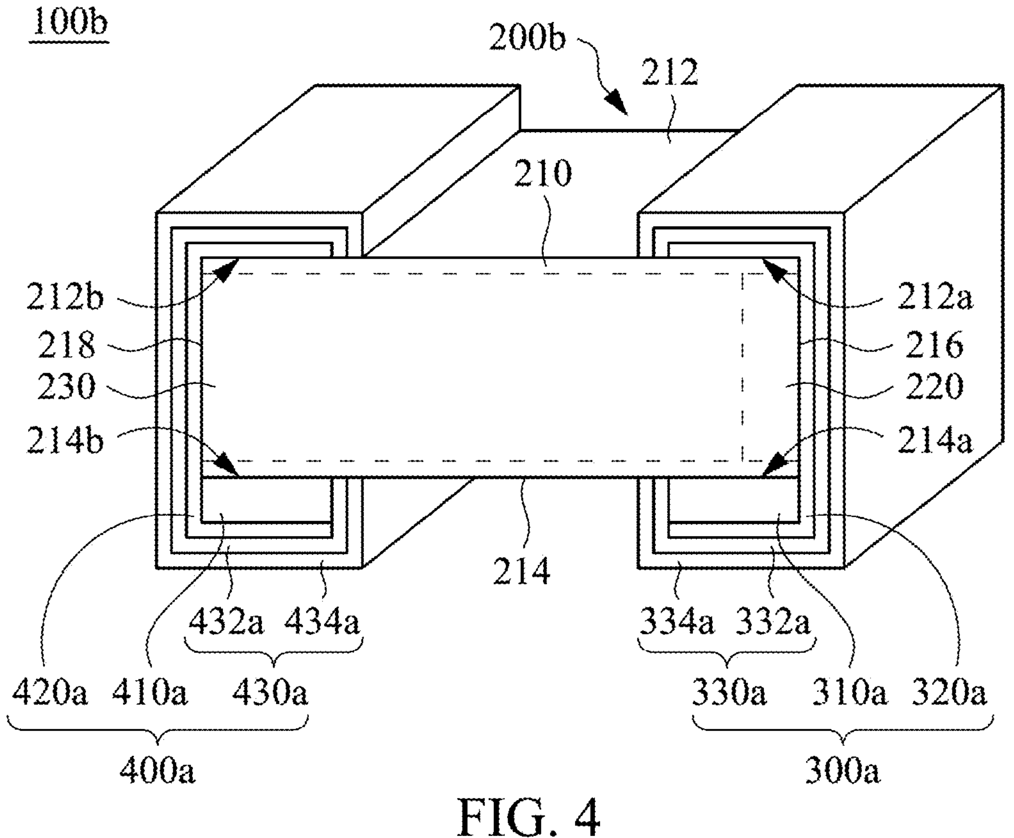
FIG. 4 is a schematic three-dimensional view of a multi-layer ceramic capacitor in accordance with a third embodiment of the present disclosure.
Figure 5:
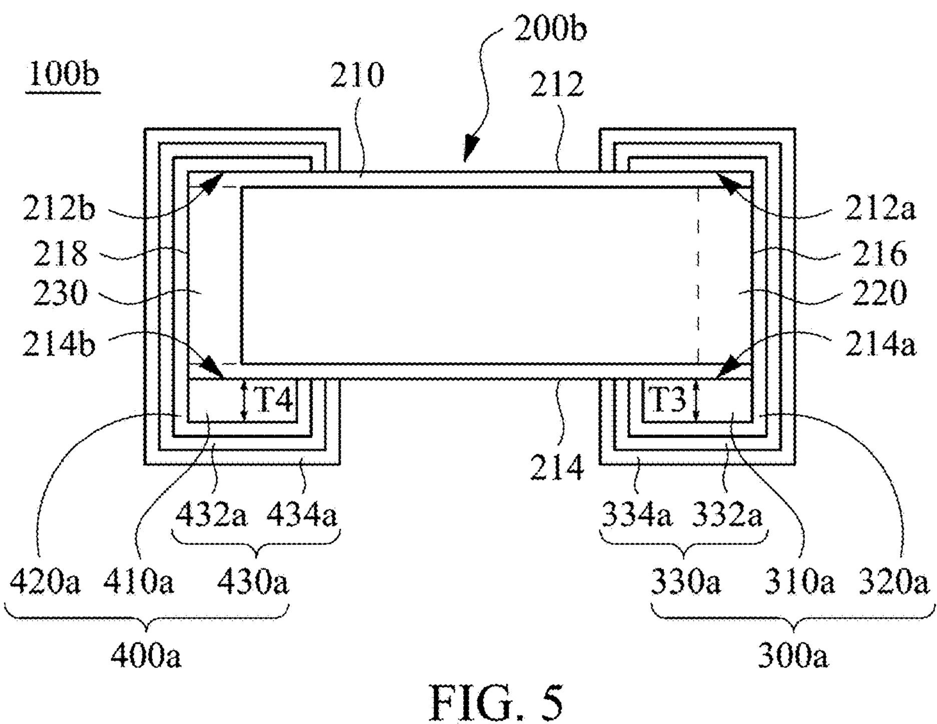
FIG. 5 is a schematic cross-sectional view of the multi-layer ceramic capacitor in accordance with the third embodiment of the present disclosure.

Referring to FIG. 4 and FIG. 5, FIG. 4 and FIG. 5 respectively illustrate a schematic three-dimensional view and a schematic cross-sectional view of a multi-layer ceramic capacitor 100*b* in accordance with a third embodiment of the present disclosure. The structure of the multi-layer ceramic capacitor 100*b* is substantially the same as the structure of the multi-layer ceramic capacitor 100, and a difference between the multi-layer ceramic capacitors 100*b* and 100 is that structures of a first terminal electrode 300*a* and a second terminal electrode 400*a* in a multi-layer brick 200*b* of the multi-layer ceramic capacitor 100*b* are different from those of the aforementioned first terminal electrode 300 and the second terminal electrode 400.

A first stress buffer layer 310*a* of the first terminal electrode 300*a* is directly disposed on the first portion 214*a* of the second surface 214 of the ceramic body 210, and is in contact with the first portion 214*a*. In addition, the first stress buffer layer 310*a* does not extend on the first end surface 216. In the present embodiment, a material of the first stress buffer layer 310*a* is a conductive or non-conductive soft material. For example, the material of the first stress buffer layer 310*a* may be a conductive material, such as silver paste or copper paste, or may be a non-conductive material, such as epoxy resin. A thickness T3 of the first stress buffer layer 310*a* is equal to or greater than 100 μm.

Similarly, the first terminal electrode 300*a* includes a first terminal electrode inner layer 320*a* and a first terminal electrode outer layer 330*a*. The first terminal electrode inner layer 320*a* covers the first portion 212*a* of the first surface 212 of the ceramic body 210, the first end surface 216, and the first stress buffer layer 310*a*. In the present embodiment, the first terminal electrode inner layer 320*a* may be formed by a sputtering process, such as a sputtering process using plasma. The temperature of the sputtering process is lower, and the first terminal electrode inner layer 320*a* does not need to be thermally cured after being formed by sputtering, such that it can prevent the first stress buffer layer 310*a* from being damaged.

The first terminal electrode outer layer 330*a* covers the first terminal electrode inner layer 320*a* and the first stress buffer layer 310*a*. The first terminal electrode outer layer 330*a* may include a first conductive layer 332*a* and a second conductive layer 334*a* stacked on each other. The first conductive layer 332*a* covers the first terminal electrode inner layer 320*a* and the first stress buffer layer 310*a*. The second conductive layer 334*a* covers the first conductive layer 332*a*.

A second stress buffer layer 410*a* of the second terminal electrode 400*a* is directly disposed on the second portion 214*b* of the second surface 214, and is in contact with the second portion 214*b*. In addition, the second stress buffer layer 410*a* does not extend on the second end surface 218. A material of the second stress buffer layer 410*a* is a conductive or non-conductive soft material. For example, the material of the second stress buffer layer 410*a* may be a conductive material, such as silver paste or copper paste, or may be a non-conductive material, such as epoxy resin. A thickness T4 of the second stress buffer layer 410*a* is equal to or greater than 100 μm.

Similarly, the second terminal electrode 400*a* includes a second terminal electrode inner layer 420*a* and a second terminal electrode outer layer 430*a*. The second terminal electrode inner layer 420*a* covers the second portion 212*b* of the first surface 212, the second end surface 218, and the second stress buffer layer 410*a*. In the present embodiment, the second terminal electrode inner layer 420*a* may be formed by, for example, a sputtering process using plasma.

The second terminal electrode outer layer 430*a* covers the second terminal electrode inner layer 420*a* and the second stress buffer layer 410*a*. The second terminal electrode outer layer 430*a* may include a third conductive layer 432*a* and a fourth conductive layer 434*a* stacked on each other. The third conductive layer 432*a* covers the second terminal electrode inner layer 420*a* and the second stress buffer layer 410*a*. The fourth conductive layer 434*a* covers the third conductive layer 432*a*.

Materials of the first terminal electrode inner layer 320*a* and the second terminal electrode inner layer 420*a* may be copper, silver, or silver-palladium alloy. Material of the first conductive layer 332*a* and the third conductive layer 432*a* may be nickel, and material of the second conductive layer 334*a* and the fourth conductive layer 434*a* may be tin.

Figure 6:
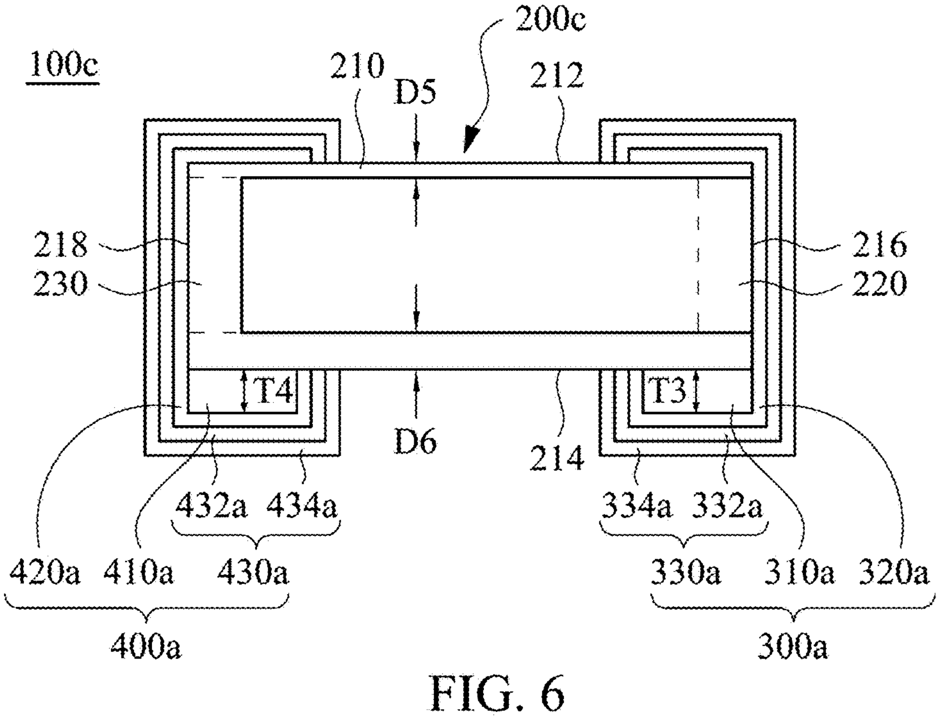
FIG. 6 is a schematic cross-sectional view of a multi-layer ceramic capacitor in accordance with a fourth embodiment of the present disclosure.

Referring to FIG. 6, FIG. 6 is a schematic cross-sectional view of a multi-layer ceramic capacitor 100*c* in accordance with a fourth embodiment of the present disclosure. The structure of the multi-layer ceramic capacitor 100*c* is substantially the same as the structure of the multi-layer ceramic capacitor 100*b*, and a difference between the multi-layer ceramic capacitors 100*c* and 100*b* is that a first distance D5 that first internal electrodes 220 and second internal electrodes 230 of a multi-layer brick 200*c* of the multi-layer ceramic capacitor 100*c* are separated from the first surface 212 of the ceramic body 210 is smaller than a second distance D6 that the first internal electrodes 220 and the second internal electrodes 230 are separated from the second surface 214. In some examples, the first distance D5 is equal to or greater than 25 μm, and the second distance D6 is equal to or greater than 100 μm.

According to the aforementioned description, it can be known that the embodiments of the present disclosure arrange the stress buffer layers within the terminal electrodes, such that an impact of expansion and contraction of the ceramic body on a circuit board due to a piezoelectric effect can be decreased, and a distance between the ceramic body and the circuit board can be increased. Therefore, a vibration amplitude of the circuit board can be greatly reduced, and the resonance of the air between the ceramic body and the circuit board can be prevented, such that a howling problem of the multi-layer ceramic capacitor is effectively solved. In addition, the internal electrodes may be arranged to be perpendicular to the upper surface and the lower surface of the ceramic body, such that an acoustic noise value of the multi-layer ceramic capacitor is not affected by an amount of a solder paste used for external bonding. Furthermore, the internal electrodes may be disposed further away from the lower surface of the ceramic body and closer to the upper surface of the ceramic body to increase the distance between the internal electrodes and the underlying circuit board, such that the vibration of the circuit board is further reduced.

Although the present disclosure has been disclosed above with embodiments, it is not intended to limit the present disclosure. Any person having ordinary skill in the art can make various changes and modifications without departing from the spirit and scope of the present disclosure. Therefore, the protection scope of the present disclosure should be defined by the scope of the appended claims.

What is claimed is:

1. A multi-layer ceramic capacitor, comprising:

a multi-layer brick, comprising:

a ceramic body having a first surface and a second surface that are opposite to each other, and a first end surface and a second end surface that are opposite to each other, wherein the first end surface and the second end surface are connected between the first surface and the second surface; and a plurality of first internal electrodes and a plurality of second internal electrodes alternately embedded in the ceramic body in sequence and physically separated from each other, wherein the first internal electrodes extend from the first end surface toward the second end surface and are spaced apart from the second end surface, and the second internal electrodes extend from the second end surface toward the first end surface and are spaced apart from the first end surface;

a first terminal electrode extending from a first portion of the first surface through the first end surface to a first portion of the second surface, wherein the first terminal electrode comprises a first stress buffer layer located in an inner of the first terminal electrode under the first portion of the second surface, and the first stress buffer layer is only disposed on the first portion of the second surface and does not extend on the first end surface; and a second terminal electrode extending from a second portion of the first surface through the second end surface to a second portion of the second surface, wherein the first terminal electrode and the second terminal electrode are physically separated from each other, and the second terminal electrode comprises a second stress buffer layer located in an inner of the second terminal electrode under the second portion of the second surface, and the second stress buffer layer is only disposed under the second portion of the second surface and does not extend on the second end surface.

2. The multi-layer ceramic capacitor of claim 1, wherein the first internal electrodes and the second internal electrodes are perpendicular to the first surface and the second surface.

3. The multi-layer ceramic capacitor of claim 2, wherein the first terminal electrode comprises:

a first terminal electrode inner layer covering the first portion of the first surface, the first end surface, and the first portion of the second surface, wherein the first stress buffer layer is located under the first terminal electrode inner layer; and a first terminal electrode outer layer covering the first terminal electrode inner layer and the first stress buffer layer; and the second terminal electrode comprises:

a second terminal electrode inner layer covering the second portion of the first surface, the second end surface, and the second portion of the second surface, wherein the second stress buffer layer is located under the second terminal electrode inner layer; and a second terminal electrode outer layer covering the second terminal electrode inner layer and the second stress buffer layer.

4. The multi-layer ceramic capacitor of claim 3, wherein a thickness of the first stress buffer layer and a thickness of the second stress buffer layer are both equal to or greater than 100 μm.

5. The multi-layer ceramic capacitor of claim 3, wherein the first internal electrodes and the second internal electrodes are separated from the first surface by a first distance, the first internal electrodes and the second internal electrodes are separated from the second surface by a second distance, the first distance is equal to the second distance, and the first distance and the second distance are equal to or greater than 25 μm.

6. The multi-layer ceramic capacitor of claim 3, wherein the first internal electrodes and the second internal electrodes are separated from the first surface by a first distance, the first internal electrodes and the second internal electrodes are separated from the second surface by a second distance, and the second distance is greater than the first distance, wherein the first distance is equal to or greater than 25 μm, and the second distance is equal to or greater than 100 μm.

7. The multi-layer ceramic capacitor of claim 3, wherein materials of the first stress buffer layer and the second stress buffer layer are silver paste or copper paste.

8. The multi-layer ceramic capacitor of claim 3, wherein
the first terminal electrode outer layer comprises:
a first conductive layer covering the first terminal electrode inner layer and the first stress buffer layer; and
a second conductive layer covering the first conductive layer; and
the second terminal electrode outer layer comprises:
a third conductive layer covering the second terminal electrode inner layer and the second stress buffer layer; and
a fourth conductive layer covering the third conductive layer.

9. The multi-layer ceramic capacitor of claim 8, wherein materials of the first terminal electrode inner layer and the second terminal electrode inner layer are copper, silver, or silver-palladium alloy, materials of the first conductive layer and the third conductive layer are nickel, and materials of the second conductive layer and the fourth conductive layer are tin.

10. The multi-layer ceramic capacitor of claim 2, wherein
the first stress buffer layer and the second stress buffer layer respectively contact with the first portion and the second portion of the second surface;
the first terminal electrode comprises:
a first terminal electrode inner layer covering the first portion of the first surface, the first end surface, and the first stress buffer layer; and
a first terminal electrode outer layer covering the first terminal electrode inner layer and the first stress buffer layer; and
the second terminal electrode comprises:
a second terminal electrode inner layer covering the second portion of the first surface, the second end surface, and the second stress buffer layer; and
a second terminal electrode outer layer covering the second terminal electrode inner layer and the second stress buffer layer.

11. The multi-layer ceramic capacitor of claim 10, wherein a thickness of the first stress buffer layer and a thickness of the second stress buffer layer are both equal to or greater than 100 μm.

12. The multi-layer ceramic capacitor of claim 10, wherein the first internal electrodes and the second internal electrodes are separated from the first surface by a first distance, the first internal electrodes and the second internal electrodes are separated from the second surface by a second distance, the first distance is equal to the second distance, and the first distance and the second distance are equal to or greater than 25 μm.

13. The multi-layer ceramic capacitor of claim 10, wherein the first internal electrodes and the second internal electrodes are separated from the first surface by a first distance, the first internal electrodes and the second internal electrodes are separated from the second surface by a second distance, and the second distance is greater than the first distance, wherein the first distance is equal to or greater than 25 μm, and the second distance is equal to or greater than 100 μm.

14. The multi-layer ceramic capacitor of claim 10, wherein materials of the first stress buffer layer and the second stress buffer layer are silver paste or copper paste.

15. The multi-layer ceramic capacitor of claim 10, wherein materials of the first stress buffer layer and the second stress buffer layer are non-conductive materials.

16. The multi-layer ceramic capacitor of claim 10, wherein
the first terminal electrode outer layer comprises:
a first conductive layer covering the first terminal electrode inner layer and the first stress buffer layer; and
a second conductive layer covering the first conductive layer; and
the second terminal electrode outer layer comprises:
a third conductive layer covering the second terminal electrode inner layer and the second stress buffer layer; and
a fourth conductive layer covering the third conductive layer.

* * * * *